US011912539B2

(12) United States Patent
Husmann

(10) Patent No.: US 11,912,539 B2
(45) Date of Patent: Feb. 27, 2024

(54) METHOD FOR ERECTING AN ELEVATOR INSTALLATION

(71) Applicant: Inventio AG, Hergiswil (CH)

(72) Inventor: Josef Husmann, Lucerne (CH)

(73) Assignee: INVENTIO AG, Hergiswil (CH)

( * ) Notice: Subject to any disclaimer, the term of this patent is extended or adjusted under 35 U.S.C. 154(b) by 66 days.

(21) Appl. No.: 17/757,233

(22) PCT Filed: Dec. 15, 2020

(86) PCT No.: PCT/EP2020/086168

§ 371 (c)(1),
(2) Date: Jun. 13, 2022

(87) PCT Pub. No.: WO2021/122561

PCT Pub. Date: Jun. 24, 2021

(65) Prior Publication Data

US 2023/0002195 A1 Jan. 5, 2023

(30) Foreign Application Priority Data

Dec. 18, 2019 (EP) .................................... 19217736

(51) Int. Cl.
*B66B 9/02* (2006.01)
*B66B 5/00* (2006.01)
*B66B 11/00* (2006.01)

(52) U.S. Cl.
CPC .............. *B66B 9/02* (2013.01); *B66B 5/0018* (2013.01); *B66B 11/0005* (2013.01); *B66B 11/005* (2013.01)

(58) Field of Classification Search
CPC ..... B66B 9/02; B66B 5/0018; B66B 11/0005; B66B 11/005
See application file for complete search history.

(56) References Cited

U.S. PATENT DOCUMENTS 5,464,072 A * 11/1995 Muller ...................... B66B 9/02 182/12
5,501,295 A * 3/1996 Muller ...................... B66B 9/00 187/406
(Continued)

FOREIGN PATENT DOCUMENTS

CN 102398823 B 5/2015
CN 106006303 A 10/2016
(Continued)

*Primary Examiner* — Michael A Riegelman
(74) *Attorney, Agent, or Firm* — William J. Clemens; Shumaker, Loop & Kendrick, LLP

(57) ABSTRACT

A method for centering a self-propelled elevator car in an elevator installation, the car having at least two driven friction wheels pressed against each of two opposing guide surfaces of a first and second guide rail strands to drive the car along a travel path, the method including independently adjusting a first rotational speed of the friction wheels acting on the first guide rail strand and a second rotational speed of the friction wheels acting on the second guide rail strand. In a centered state, a center of the car is located on a center plane extending in parallel with the first and second guide rail strands, and when a deviation of the car center from the center plane is detected, the first rotational speed and/or the second rotational speed is changed such that, when the car moves along the travel path, the car center moves toward the center plane.

14 Claims, 10 Drawing Sheets

(56) References Cited

U.S. PATENT DOCUMENTS

| | | | | | |
|---|---|---|---|---|---|
| 5,566,784 | A * | 10/1996 | Rennetaud | B66B 9/02 187/257 |
| 5,636,712 | A * | 6/1997 | Muller | B66B 9/02 187/250 |
| 5,713,432 | A * | 2/1998 | Richter | B66B 11/0206 187/250 |
| 5,921,351 | A * | 7/1999 | Schroder-Brumloop | B66B 9/02 187/270 |
| 10,246,298 | B2 * | 4/2019 | Piech | B66B 11/04 |
| 11,027,944 | B2 * | 6/2021 | Bhaskar | B66B 11/0407 |
| 11,383,959 | B1 * | 7/2022 | Cornett, Jr. | B66B 19/00 |
| 11,390,490 | B2 * | 7/2022 | Bhaskar | B66B 11/0206 |
| 11,407,617 | B2 * | 8/2022 | Bhaskar | B66B 7/022 |
| 11,667,497 | B2 * | 6/2023 | Bhaskar | B66B 11/0005 187/250 |
| 2007/0272494 | A1 * | 11/2007 | Kocher | B66B 9/02 187/350 |
| 2018/0273349 | A1 * | 9/2018 | Weibel | B66B 7/024 |
| 2020/0277158 | A1 * | 9/2020 | Christen | B66B 5/284 |
| 2021/0206602 | A1 * | 7/2021 | Studer | B66B 9/02 |
| 2022/0048729 | A1 * | 2/2022 | Roberts | B66B 9/02 |
| 2022/0055865 | A1 * | 2/2022 | Roberts | B66B 9/02 |
| 2022/0177273 | A1 * | 6/2022 | Wong | B66B 9/003 |
| 2022/0380179 | A1 * | 12/2022 | Hutchinson | B66B 1/3461 |
| 2023/0002195 | A1 * | 1/2023 | Husmann | B66B 5/0018 |
| 2023/0025567 | A1 * | 1/2023 | Baumgartner | B66B 9/02 |

FOREIGN PATENT DOCUMENTS

| | | | |
|---|---|---|---|
| DE | 102011118544 | A1 | 5/2013 |
| EP | 0595122 | A1 | 5/1994 |
| EP | 0745551 | A1 | 12/1996 |
| EP | 0745553 | A1 | 12/1996 |
| EP | 0870718 | A1 | 10/1998 |
| EP | 1364904 | A1 | 11/2003 |
| JP | 2012006677 | A | 1/2012 |

* cited by examiner

HOLDING BRAKE
FREQUENCY INVERTER
Detail X
X
4
4.1
4.1.1
4.2
5
5.1
7.1
8
13
30.1
32
33
34
37

Fig. 4A
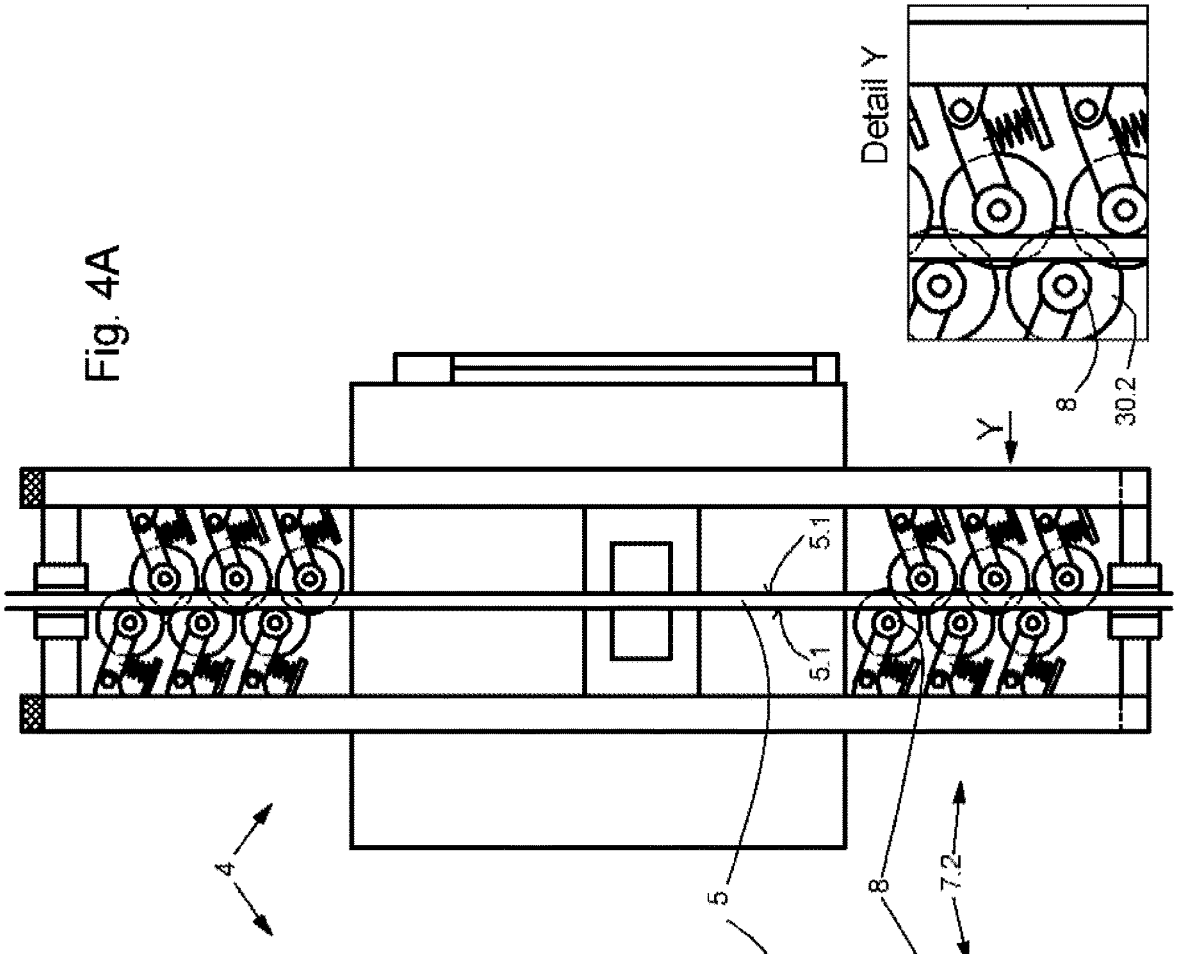
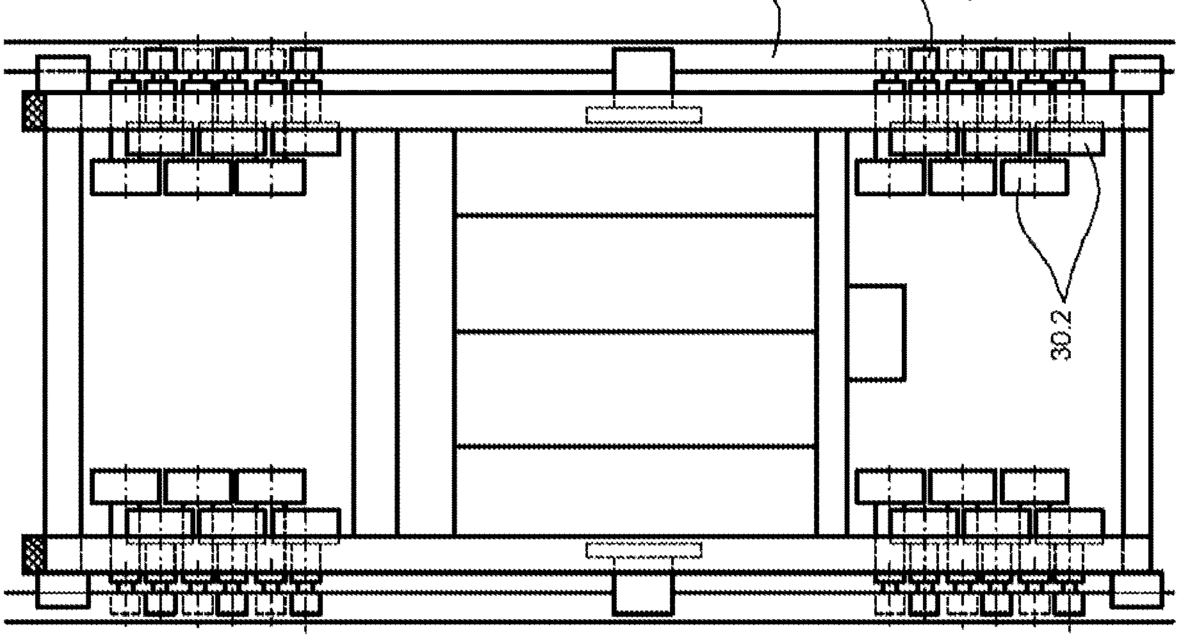
Fig. 4B

HOLDING BRAKE
Detail Z
30.3
8
Z
8
4
37
7.3
8
30.3
30.3
36
HYDRAULIC POWER UNIT

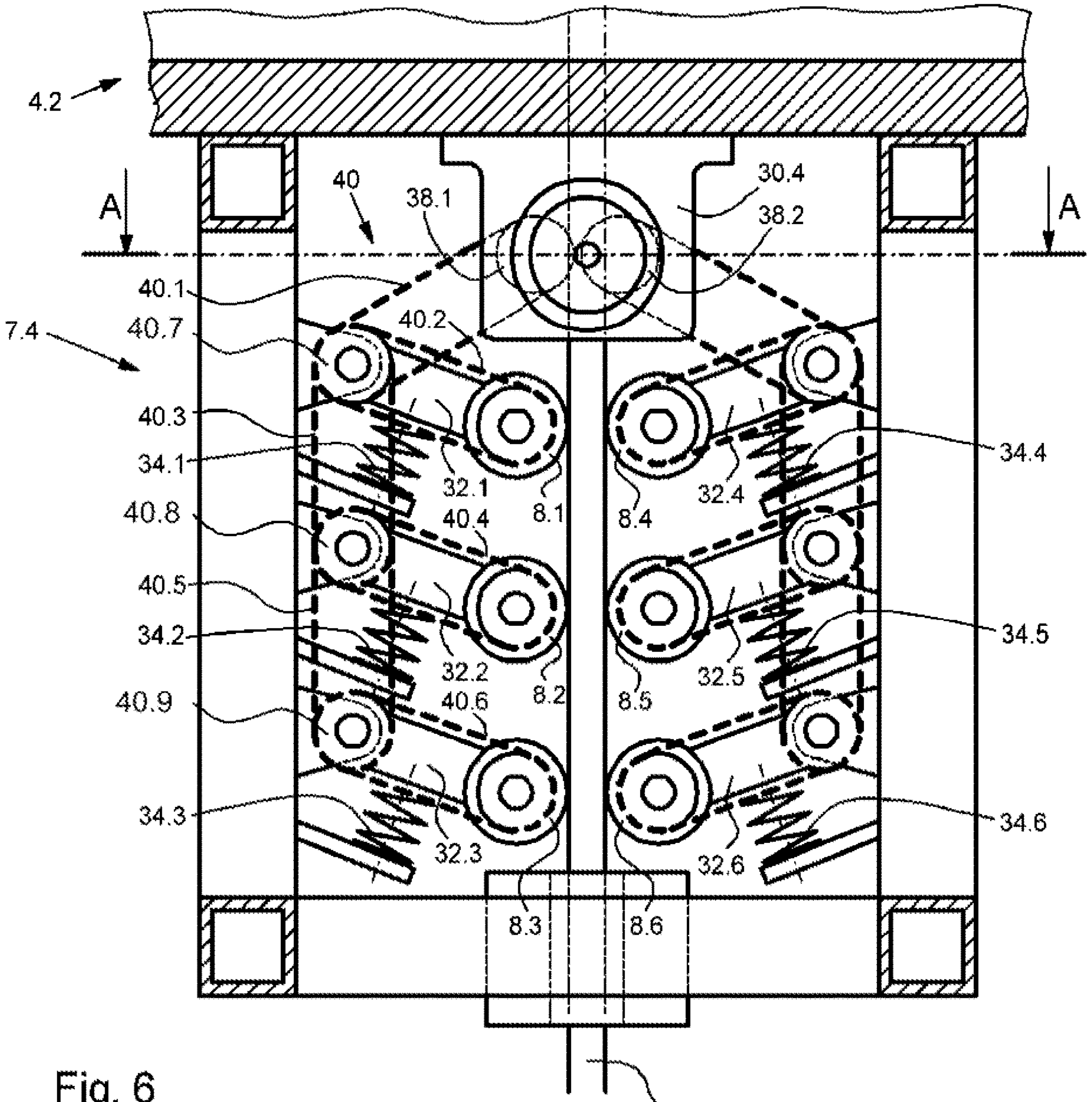
Fig. 6
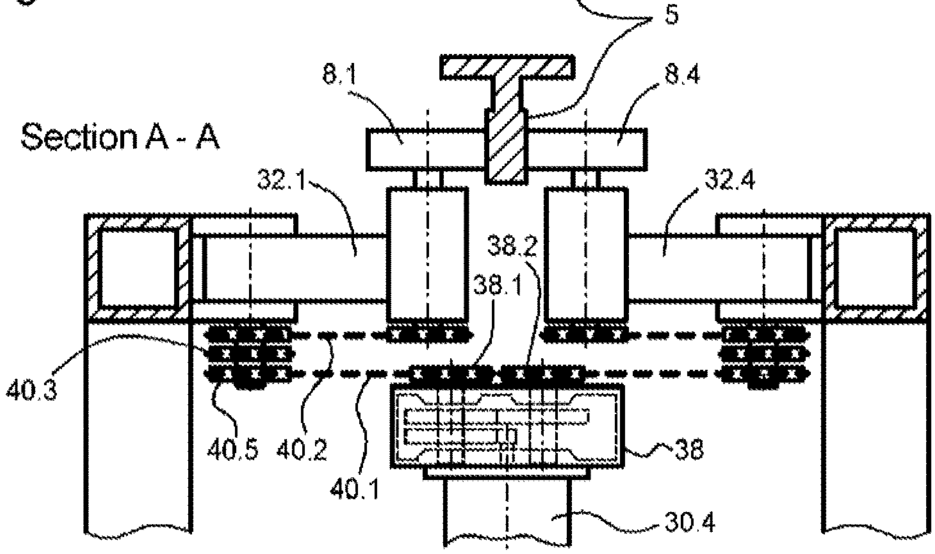
Section A - A

METHOD FOR ERECTING AN ELEVATOR INSTALLATION

FIELD

The invention relates to a method for erecting an elevator installation in an elevator shaft of a new building, in which method, for the duration of the construction phase of the building, a construction phase elevator system having a self-propelled construction phase elevator car is installed in the elevator shaft which becomes taller with the increasing building height, the usable lifting height of the construction phase elevator car gradually being adapted to a currently present elevator shaft height.

BACKGROUND

CN106006303 A discloses an internal construction elevator which is installed in an elevator shaft of a building that is in its construction phase. The installation of this elevator takes place synchronously with the erection of the building, i.e. the usable lifting height of the internal construction elevator grows with the increasing height of the building or elevator shaft. Adapting the usable lifting height in this way means that construction specialists and construction material can be transported to the current uppermost part of the building during the construction progress and, moreover, such an elevator can be used as a passenger and freight elevator for floors already used as residential or business premises during the construction phase of the building. In order to be able to easily achieve an increasing usable lifting height of the elevator, the elevator car thereof is designed as a self-propelled elevator car that is moved up and down by a drive system that comprises a rack strand and a pinion that is attached to the elevator car and interacts with the rack strand. A guide system for the elevator car, the length of which guide system can be adapted to the current elevator shaft height, is installed along the elevator shaft, and the rack strand, which has a length that can also be adapted to the current elevator shaft height, is fixed to this guide system parallel to the guide direction thereof. The pinion interacting with the rack strand in order to drive the elevator car is fastened to the output shaft of a drive unit arranged on the elevator car. Energy is supplied to the drive unit via an electrical conductor line.

The internal construction elevator described in CN106006303 A, which has a backpack guide and rack drive, is not suitable as an elevator having a high travel speed. However, high travel speeds of for example at least 3 m/s are necessary for final elevator systems in buildings in which the building height justifies the installation of a construction phase elevator system, the usable lifting height of which can be adapted to an increasing height of the elevator shaft during the construction phase of the building.

SUMMARY

According to a first aspect of the invention, the problem addressed is that of providing a method of the type described at the outset, with the use of which the disadvantages of the internal construction elevator cited as prior art can be avoided. In particular, the method is intended to solve the problem that the travel speed that can be achieved by the internal construction elevator is not sufficient for being used for a normal passenger and goods elevator after completion of a tall building.

The problem is solved, according to the first aspect of the invention, by a method of the type described above, in which method, for the duration of the construction phase of the building, a construction phase elevator system is installed in the elevator shaft which becomes higher with the increasing height of the building, which system comprises a self-propelled construction phase elevator car, the usable lifting height of which can be adapted to an increasing elevator shaft height, wherein at least one guide rail strand is installed in order to guide the construction phase elevator car along its travel path in the elevator shaft, wherein, in order to drive the construction phase elevator car, a drive system is mounted which comprises a primary part attached to the construction phase elevator car and a secondary part attached along the travel path of the construction phase elevator car, wherein the guide rail strand and the secondary part of the drive system are gradually extended upwards during the construction phase in accordance with the increasing elevator shaft height, wherein the self-propelled construction phase elevator car is used both for transporting persons and/or material for the construction of the building and as a passenger and freight elevator for floors already used as residential or business premises during the construction phase of the building, and wherein, after the elevator shaft has reached its final height, a final elevator system is installed in the elevator shaft instead of the construction phase elevator system, which final elevator system is modified by comparison with the construction phase elevator system.

The advantages of the method according to the invention can be seen in particular in the fact that, during the construction phase, an elevator optimal for this phase is available, by means of which the already constructed floors may be reached without repeatedly lifting a movable machine room, in order to transport construction specialists, construction material and residents of already created lower floors, and also in the fact that, after the elevator shaft has reached its final height, a final elevator system that is particularly suitable for the building in terms of travel speed can be used. Possible modifications may consist, for example, in using a drive motor and/or associated speed regulating device having a higher power, changing transmission ratios in drive components or diameters of traction sheaves or friction wheels, installing elevator cars having a reduced weight or other dimensions and equipment, or integrating a counterweight into the final elevator system.

In one of the possible embodiments of the method according to the invention according to the first aspect, a final elevator system is installed in the elevator shaft instead of the construction phase elevator system, in which final elevator system a drive system of an elevator car is modified by comparison with the drive system of the construction phase elevator car. By modifying the drive system of the elevator car of the final elevator system, at least the necessary high travel speed of the elevator car of the final elevator system can be achieved. Examples of possible modifications of the elevator system include increasing the drive power of the drive motor and the associated speed control device, changing transmission ratios of drive components, using a different type of drive, for example a type of drive not suitable for a self-propelled elevator car, etc.

In a further possible embodiment of the method according to the invention according to the first aspect, the drive system of the elevator car of the final elevator system is based on a different operating principle to the drive system of the construction phase elevator car. Since the final elevator system and thus the associated drive system do not have to meet the requirement of being adaptable to an increasing building height, the use of a drive system based on a different operating principle makes it possible to optimally adapt the final elevator system to requirements concerning travel speed, transport efficiency and travel comfort. In the present context, the term “operating principle” refers to the manner of generating a force for lifting an elevator car and transmitting the force to the elevator car. Preferred drive systems having an operating principle different from that of the self-propelled construction phase elevator car are drives having flexible suspension means, such as wire cables or belts, which support and drive the elevator car of a final elevator system in various arrangement variants of the drive machine and suspension means. In general, however, it is possible to use all drive systems—including, for example, electric linear motor drives, hydraulic drives, recirculating ball screw drives, etc.—of which the operating principle differs from the operating principle of the drive system of the self-propelled construction phase elevator car and which are suitable for relatively large lifting heights and are able to generate sufficiently high travel speeds of the elevator car.

In a further possible embodiment of the method according to the invention according to the first aspect, a final elevator car of the final elevator system is guided on the same at least one guide rail strand on which the construction phase elevator car was guided. This avoids the large amount of work, the high costs and, in particular, the long interruption period to elevator operation needed to replace at least one guide rail strand.

In another possible embodiment of the method according to the invention according to the first aspect, the construction phase elevator car is used during the construction phase of the building both for transporting persons and/or material for the construction of the building and as a passenger and freight elevator for floors already used as residential or business premises during the construction phase of the building.

This ensures that construction workers and building materials can be transported in the construction phase elevator car during almost the entire construction period of the building. Moreover, users of apartments or business premises occupied before the building has been completed can be transported between at least the floors associated with these rooms in compliance with the regulations, without having to interrupt operation for days on end when adjustments are made to the lifting height of the construction phase elevator car.

In a further possible embodiment of the method according to the invention according to the first aspect, an assembly platform and/or a protective platform is/are temporarily installed above a current upper limit of the travel path of the construction phase elevator car, as a result of which, during the adaptation of the usable lifting height of the construction phase elevator car to an increasing elevator shaft height, the assembly platform and/or the protective platform can be lifted to a higher elevator shaft level by means of the self-propelled construction phase elevator car. This ensures that the at least one protective platform, which is relatively heavy and absolutely necessary as protection against falling objects, and optionally also an assembly platform can be lifted along the newly created elevator shaft and fixed in a new position with little effort in terms of working time and lifting devices.

In a further possible embodiment of the method according to the invention according to the first aspect, the protective platform which can be lifted by means of the self-propelled construction phase elevator car is designed as an assembly platform, from which at least the at least one guide rail strand is extended upwards. The combination of protective platform and assembly platform results in cost savings in terms of their manufacturing. Moreover, the protective platform and the assembly platform can each be brought into and fixed in a new position in the elevator shaft, which new position is suitable for the assembly work to be carried out, in a single work step and without additional lifting equipment, by lifting by means of the self-propelled construction phase elevator car.

In a further possible embodiment of the method according to the invention according to the first aspect, the primary part of the drive system assembled for driving the construction phase elevator car comprises a plurality of driven friction wheels, the construction phase elevator car being driven by an interaction of the driven friction wheels with the secondary part of the drive system that is attached along the travel path of the construction phase elevator car. The use of friction wheels as the primary part of a drive of a construction phase elevator car is advantageous because a corresponding secondary part extending along the entire travel path can be produced from simple and inexpensive elements, and because relatively high speeds can be realized by using friction wheel drives while keeping noise generation low.

In a further possible embodiment of the method according to the invention according to the first aspect, the at least one guide rail strand is used as a secondary part of the drive system of the self-propelled construction phase elevator car. Using the guide rail strand, which is necessary for both the construction phase elevator car and the final elevator car, as the secondary part of the drive system means that very high costs for manufacturing and, in particular, for the installation and adjustment of such a secondary part extending over the entire elevator shaft height can be saved.

In a further possible embodiment of the method according to the invention according to the first aspect, at least two driven friction wheels are pressed against each of two opposing guide surfaces of the at least one guide rail strand in order to drive the construction phase elevator car, the friction wheels that act on the same guide surface in each case being arranged spaced apart from another in the direction of the guide rail strand. By arranging at least four driven friction wheels acting on each guide rail strand in this way, the necessary high driving force for lifting at least the construction phase elevator car and the protective platform or the combination of protective platform and assembly platform can be achieved.

In a further possible embodiment of the method according to the invention according to the first aspect, at least one of the friction wheels is rotationally mounted at one end of a pivot lever which is pivotally mounted at its other end on a pivot axle fixed to the construction phase elevator car, the pivot axle of the pivot lever being arranged such that the center of the friction wheel lies below the center of the pivot axle when the friction wheel is placed or pressed against the guide surface of the guide rail strand associated therewith. Such an arrangement of the at least one friction wheel ensures that, when the construction phase elevator car is driven in an upward direction, a pressing force is automatically established between the friction wheel and the guide surface, which pressing force is approximately proportional to the driving force transmitted from the guide surface to the friction wheel. This avoids the friction wheels always having to be pressed hard enough to transmit a driving force necessary for the maximum total weight of the construction phase elevator car.

In a further possible embodiment of the method according to the invention, the at least one friction wheel is pressed against a guide surface of a guide rail strand at any time with a minimum pressing force by the effect of a spring member, for example a helical compression spring. In combination with the described arrangement of the friction wheels, the minimum pressing force means that, as soon as the friction wheels start driving the construction phase elevator car in an upward direction, pressing forces between the friction wheels and the guide surfaces of the guide rail strand are automatically adjusted, which pressing forces are approximately proportional to the current total weight of the construction phase elevator car.

In a further possible embodiment of the method according to the invention according to the first aspect, the at least one friction wheel is driven by an electric motor exclusively associated with this friction wheel or by a hydraulic motor exclusively associated with this friction wheel. A drive arrangement of this kind allows a very simple and compact drive configuration.

In a further possible embodiment of the method according to the invention according to the first aspect, the at least one friction wheel and the electric motor associated therewith or the friction wheel and the associated hydraulic motor are arranged on the same axis. Such an arrangement of friction wheel and drive motor can further simplify the entire drive configuration.

In a further possible embodiment of the method according to the invention according to the first aspect, in a drive system in which at least two driven friction wheels are pressed against each of two opposing guide surfaces of the at least one guide rail strand and each friction wheel and its associated electric motor are arranged on the same axis, the electric motors of the friction wheels acting on the one guide surface of a guide rail strand are arranged so as to be offset, with respect to the electric motors of the friction wheels acting on the other guide surface, by approximately one length of an electric motor in the axial direction of the friction wheels and electric motors. As a result of the electric motors, the diameters of which are substantially larger than the diameters of the friction wheels, being arranged so as to be offset from each other in the axial direction, the installation spaces of the electric motors of the friction wheels acting on the one guide surface of the guide rail strand do not overlap with the installation spaces of the electric motors of the friction wheels acting on the other guide surface of the guide rail strand, even if the friction wheels arranged on either side of the guide rail strand are positioned so that their mutual distances, measured in the direction of the guide rail strand, are not substantially larger than the diameters of the electric motors. The necessary height of the installation space for the drive system is minimized by this arrangement of the drive system, particularly when using drive electric motors having relatively large diameters.

In a further possible embodiment of the method according to the invention according to the first aspect, at least one group of a plurality of friction wheels is driven by a single electric motor associated with the group or by a single hydraulic motor associated with the group, torque transmission to the friction wheels of the group being brought about by means of a mechanical gear. A drive concept of this kind can simplify the electrical or hydraulic part of the drive.

In another possible embodiment of the method according to the invention according to the first aspect, a sprocket gear, a belt gear, a toothed gear or a combination of such gears is used as mechanical gear for the torque transmission to the friction wheels. Gears of this kind make it possible to drive the friction wheels of a group of a plurality of friction wheels from a single drive motor.

In another possible embodiment of the method according to the invention according to the first aspect, each of the electric motors driving at least one friction wheel and/or an electric motor driving a hydraulic pump feeding at least one hydraulic motor driving at least one friction wheel is fed by at least one frequency converter controlled by a controller of the construction phase elevator system. A drive concept of this kind allows for perfect regulation of the travel speed of the construction phase elevator car.

In a further possible embodiment of the method according to the invention according to the first aspect, a device for supplying power to the construction phase elevator car is installed, which power supply device comprises a conductor line installed along the elevator shaft, which conductor line is extended according to the increasing elevator shaft height during the construction phase. This enables a power supply to the construction phase elevator car that can be easily adjusted to the current elevator shaft height, which power supply can also transfer the electrical power necessary for lifting the construction phase elevator car and the protective platform, or optionally for lifting the construction phase elevator car and the combination of protective platform and assembly platform.

In a further possible embodiment of the method according to the invention according to the first aspect, a holding brake acting between the construction phase elevator car and the at least one guide rail strand is activated during each standstill of the self-propelled construction phase elevator car of the construction phase elevator system, and, if there is at least one friction wheel, the torque transmitted from the associated drive motor to the at least one friction wheel in order to generate driving force is reduced to a minimum. An embodiment of this kind has the advantage that, during the standstill of the construction phase elevator car, the friction wheels do not have to apply the necessary vertical holding force. Therefore, they do not have to be pressed correspondingly hard against the guiding surfaces of the guide rail strand. In this way, the problem of the periphery of the friction linings being flattened during a standstill can be largely mitigated. Since, on account of the type of arrangement described above, each friction wheel is pressed against the guide surface approximately proportionally to the driving force transmitted between the wheel and the guide surface, it is necessary to at least reduce this driving force or the torque transmitted from the drive motor to the friction wheel.

In a further possible embodiment of the method according to the invention according to the first aspect, a primary part of an electric linear drive is used as the primary part of the drive system for driving the construction phase elevator car, and a secondary part of the electric linear drive that is fixed along the elevator shaft is used as the secondary part of the drive system. Such an embodiment of the method according to the invention has the advantage that the drive of the construction phase elevator car is contact-free and wear-free, and the traction capability of the drive cannot be impaired by dirt.

In another possible embodiment of the method according to the invention according to the first aspect, at least one electric motor or hydraulic motor that drives a pinion and is speed-controlled by means of a frequency converter is used as the primary part of the drive system in order to drive the construction phase elevator car, and at least one rack strand fixed along the elevator shaft is used as the secondary part of the drive system. Such an embodiment of the method according to the invention is advantageous in that, in the case of a rack-and-pinion drive, the driving force is transmitted in a form-fitting manner, and a holding brake on the construction phase elevator car is not necessarily required. In addition, relatively few driven pinions are required in order to transmit the entire driving force. By controlling the speed by means of a frequency inverter, during which the frequency inverter acts either on the electric motor driving at least one pinion or on an electric motor which controls the speed of a hydraulic pump feeding the hydraulic motor, the travel speed of the construction phase elevator car can be continuously regulated.

According to a second aspect of the invention, the problem addressed is that of providing a method for centering an elevator car, in particular a method for centering the construction phase elevator car in the method for erecting a final elevator installation in an elevator shaft of a building according to the first aspect of the invention, as described above and below.

The problem is solved, according to the second aspect of the invention, by a method for centering an elevator car of an elevator installation, wherein the elevator installation comprises a self-propelled elevator car, a first guide rail strand for guiding the elevator car along its travel path in the elevator shaft, a second guide rail strand, and a drive system which has a primary part attached to the elevator car and a secondary part attached along the travel path, wherein the primary part of the drive system mounted to drive the elevator car comprises a plurality of driven friction wheels, wherein the elevator car is driven by an interaction of the driven friction wheels with the secondary part of the drive system that is attached along the travel path of the elevator car, wherein the first guide rail strand and the second guide rail strand are used as the secondary part of the drive system of the self-propelled elevator car, wherein at least two driven friction wheels are pressed against each of two opposing guide surfaces of the first guide rail strand and the second guide rail strand in order to drive the elevator car, wherein the first guide rail strand lies in a first plane, wherein the second guide rail strand lies in a second plane extending in parallel with the first plane, wherein, in a centered state, a center of the elevator car is located on a center plane extending in parallel with the first and second planes, wherein a first rotational speed of the friction wheels which act on the first guide rail strand and a second rotational speed of the friction wheels which act on the second guide rail strand can be adjusted independently of one another.

In a further possible embodiment of the method according to the invention according to the second aspect, if a deviation of the center from the center plane is detected, the first rotational speed and/or the second rotational speed is changed such that, when the elevator car moves along the travel path, the center moves in the direction of the center planes.

In a further possible embodiment of the method according to the invention according to the second aspect, the elevator car comprises at least two distance sensors, in particular in the form of an eddy current sensor and/or an optical triangulation sensor, a first distance sensor measuring a first distance between the elevator car and the first guide rail strand and the second sensor measuring a second distance between the car and the second guide rail strand, the method controlling the first and/or second rotational speed on the basis of the first and the second distance.

In a further possible embodiment of the method according to the invention according to the second aspect, the elevator car comprises at least one inclination sensor, from which an angle of inclination of the car with respect to the center plane can be derived, the first and/or second rotational speed being controlled such that, when the elevator car moves along the travel path, the angle of inclination changes toward zero.

In a further possible embodiment of the method according to the invention according to the second aspect, the difference between the first rotational speed and the second rotational speed gradually increases or decreases if the center of the elevator car deviates from the center planes.

In a further possible embodiment of the method according to the invention according to the second aspect, the difference between the first rotational speed and the second rotational speed increases or decreases depending on a horizontal target speed which the elevator car is intended to have in the direction of the travel path.

In a further possible embodiment of the method according to the invention, the centering of the elevator car toward the center plane is supported by at least two passive guide rollers which are attached to the side of the car and each act on one of the two guide rail strands.

The method according to the second aspect of the invention is advantageous in that any skew of the car can be actively controlled by a controller and the load on the guide rails is thus reduced. This is particularly necessary in the event of eccentric loads in the elevator car.

DESCRIPTION OF THE DRAWINGS

In the following, embodiments of the invention are explained on the basis of the accompanying drawings, in which:

FIG. 4A is a side view of a self-propelled construction phase elevator car suitable for carrying out the method according to the invention, which car has a second embodiment of the friction wheel drive.

FIG. 4B is a front view of the construction phase elevator car according to FIG. 4A.

FIG. 6 is a detailed view of a fourth embodiment of the friction wheel drive of a self-propelled construction phase elevator car suitable for carrying out the method according to the invention, together with a cross section through the region shown by the detailed view.

DETAILED DESCRIPTION

Figure 1:
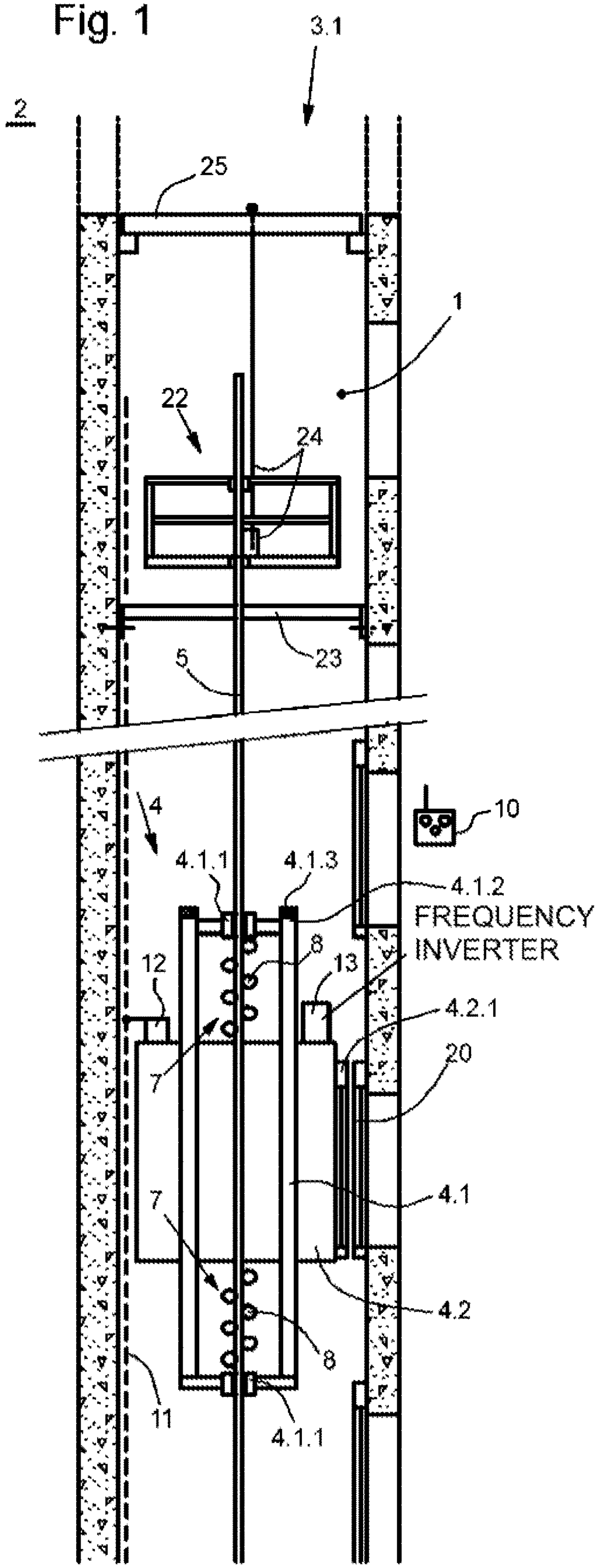
FIG. 1 is a vertical cross-sectional view through an elevator shaft having a self-propelled construction phase elevator car suitable for carrying out the method according to the invention, which car has a friction wheel drive as the drive system and has a first embodiment of assembly aid devices.

FIG. 1 schematically shows a construction phase elevator system 3.1 which is installed in an elevator shaft 1 of a building 2 in its construction phase and comprises a construction phase elevator car 4, the usable lifting height of which is gradually adapted to an increasing elevator shaft height. The construction phase elevator car 4 comprises a car frame 4.1 and a car body 4.2 mounted in the car frame. The car frame has car guide shoes 4.1.1, via which the construction phase elevator car 4 is guided on guide rail strands 5. These guide rail strands are extended upwards above the construction phase elevator car from time to time according to the construction progress and, after reaching a final elevator shaft height, are also used to guide a final elevator car (not shown) of a final elevator installation, which final elevator car replaces the construction phase elevator car 4. The construction phase elevator car 4 is designed as a self-propelled elevator car and comprises a drive system 7 which is preferably installed inside the car frame 4.1. The construction phase elevator car 4 can be equipped with different drive systems, these drive systems each comprising a primary part attached to the construction phase elevator car 4 and a secondary part attached along the travel path of the construction phase elevator car. In FIG. 1, the primary part of the drive system 7 is shown schematically by a plurality of friction wheels 8 driven by drive motors (not shown), which friction wheels interact with the at least one guide rail strand 5 forming the secondary part in order to move the construction phase elevator car 4 up and down within its currently usable lifting height. The drive motors driving the friction wheels 8 can preferably be present in the form of electric motors or in the form of hydraulic motors. Electric motors are preferably fed by at least one frequency converter system in order to allow the speed of the electric motors to be regulated. This ensures that the travel speed of the construction phase elevator car 4 can be continuously regulated so that any travel speed between a minimum speed and a maximum speed can be selected. The minimum speed is used, for example, for selecting stop positions or for driving in a manually controlled manner in order to lift assembly aid devices by means of the construction phase elevator car, and the maximum speed is used, for example, for operating an elevator operation for construction workers and for users or residents of the already constructed floors. The speed of hydraulic motors can be correspondingly controlled either by feeding the motors by means of a hydraulic pump preferably installed on the construction phase elevator car 4, the supply flow of which pump can be regulated electrohydraulically at a constant speed, or by feeding the motors by means of a hydraulic pump driven by an electric motor which can be speed-controlled by means of frequency conversion.

The drive motors of the drive system 7 of the construction phase elevator car 4 can be controlled optionally by a conventional elevator controller (not shown) or by means of a mobile manual controller 10 that preferably has wireless signal transmission.

The electric motors of the drive system of the construction phase elevator car 4 can be fed via a conductor line 11 guided along the elevator shaft 1. In this case, a frequency inverter 13 arranged on the construction phase elevator car 4 can be supplied with alternating current via the conductor line 11 and corresponding sliding contacts 12, the frequency converter feeding the electric motors driving the friction wheels 8 or at least one electric motor driving a hydraulic pump at a variable speed. Alternatively, a stationary AC-DC converter can feed direct current into such a conductor line, which direct current is tapped on the construction phase elevator car by means of the sliding contacts and supplied to the variable-speed electric motors of the drive system via at least one inverter having a controllable output frequency. If the friction wheels 8 are driven by hydraulic motors fed by a hydraulic pump having a supply flow that can be controlled at a constant speed, no frequency conversion is necessary.

In order to enable the aforementioned elevator operation for construction workers and floor users, the construction phase elevator car 4 is equipped with a car door system 4.2.1 controlled by the elevator controller, which car door system interacts with shaft doors 20 which are each installed prior to adapting the usable lifting height of the construction phase elevator car 4 along the additional travel range in elevator shaft 1.

In the construction phase elevator system 3.1 shown in FIG. 1, an assembly platform 22 is arranged above the currently usable lifting height of the construction phase elevator car 4, which assembly platform can be moved up and down along an upper portion of the elevator shaft 1. From such an assembly platform 22, the at least one guide rail strand 5 is extended above the currently usable lifting height of the construction phase elevator car 4, it also being possible to assemble other elevator components in the elevator shaft 1.

A first protective platform 25 is temporarily fixed in the uppermost region of the currently present elevator shaft 1. This protective platform protects persons and devices in elevator shaft 1, in particular in the aforementioned assembly platform 22, from objects that could fall down during the construction work taking place on the building 2. Moreover, the first protective platform 25 can be used as a supporting member for a lifting apparatus 24 by means of which the assembly platform 22 can be lifted or lowered. In the embodiment of the construction phase elevator system shown in FIG. 1, the first protective platform 25 having the assembly platform 22 suspended thereon must be lifted from time to time by means of a construction crane to a higher level corresponding to the construction progress in the current uppermost region of the elevator shaft, where the first protective platform 25 is then temporarily fixed.

FIG. 1 shows a second protective platform 23 which is temporarily fixed in the elevator shaft 1 below the assembly platform 22, which second protective platform protects persons and devices in the elevator shaft 1 from objects falling from the assembly platform 22.

In the construction phase elevator system 3.1 shown in FIG. 1, the self-propelled construction phase elevator car 4 and its drive system 7 are dimensioned such that at least the second protective platform 23 can be lifted by means of the self-propelled construction phase elevator car 4 in the elevator shaft 1 after the first protective platform 25 having the assembly platform 22 suspended therefrom has been lifted by the construction crane for the purpose of increasing the usable lifting height of the construction phase elevator car. For this purpose, the car frame 4.1 of the construction phase elevator car 4 is designed to have support members 4.1.2 which are preferably provided with damping members 4.1.3.

In another possible embodiment of the construction phase elevator system 3.1, both the second protective platform 23 and the assembly platform 22 can be lifted together by the construction phase elevator car 4 to a level desired for specific assembly work, where they are temporarily fixed in the elevator shaft 1 or temporarily held by the construction phase elevator car. Since in this case no lifting apparatus is present for lifting the assembly platform 22, this embodiment assumes that the construction phase elevator car, in addition to its function of ensuring the elevator operation for construction workers and floor users, can be made available sufficiently frequently and for a sufficiently long time for lifting and, if necessary, holding the assembly platform 22.

Figure 2:
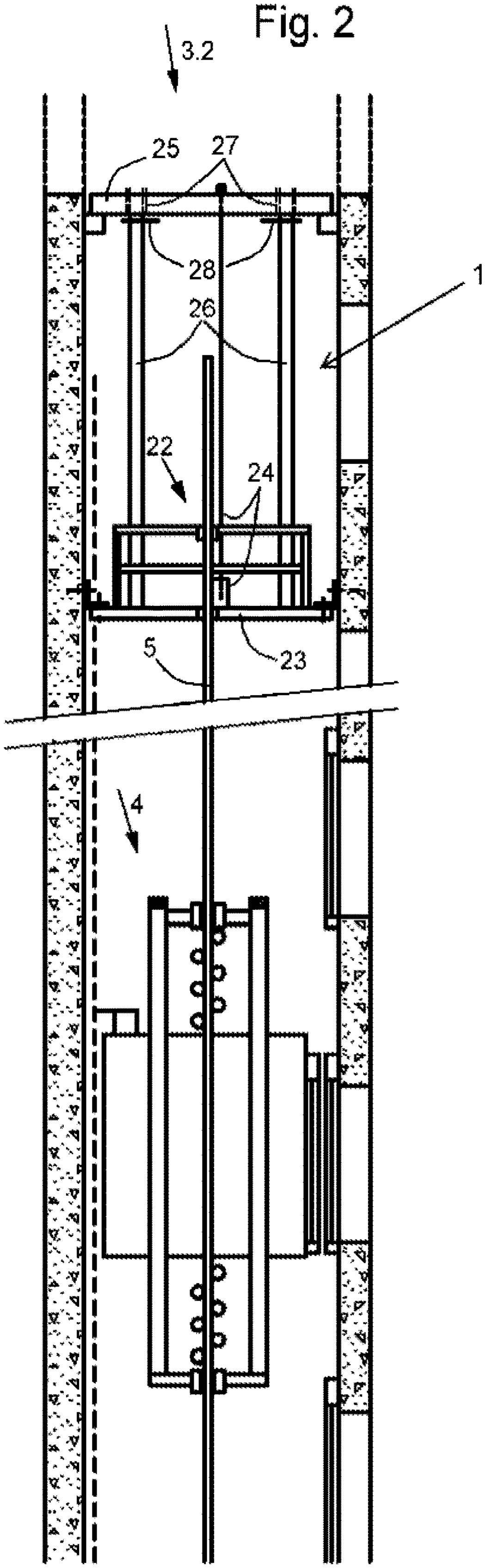
FIG. 2 is a vertical cross-sectional view through an elevator shaft having a self-propelled construction phase elevator car suitable for carrying out the method according to the invention, which car has a friction wheel drive as the drive system and has a second embodiment of assembly aid devices.

FIG. 2 shows a construction phase elevator system 3.2 which differs from the construction phase elevator system 3.1 according to FIG. 1 in that no construction crane is required to lift the first protective platform 25 and the assembly platform 22. Before any increase in the lifting height of the construction phase elevator car 4, the three components—the first protective platform 25, assembly platform 22 and second protective platform 23—are lifted with the aid of the self-propelled construction phase elevator car 4 equipped with a correspondingly powerful drive system, after which the first protective platform 25 is fixed again in a higher position above the current uppermost travel range of the construction phase elevator car. At least one distance member 26 is fixed between the assembly platform 22 and the first protective platform 25 in such a way that an intended distance is provided between the first protective platform 25 and the assembly platform 22 before the three components are lifted. The assembly platform 22, which is used for extending the at least one guide rail strand 5 and for assembling further elevator components, and the second protective platform 23 can be moved, by means of the lifting apparatus 24, in the portion of the elevator shaft 1 that lies within this distance after the three components have been lifted. Advantageously, the at least one distance member 26 is fastened at its lower end to the assembly platform 22, and, when the assembly platform is moved by means of the lifting device 24 against the first protective platform 25, the at least one distance member 26 can slide through at least one opening 27 in the first protective platform 25, which opening is associated with the at least one distance member. Before lifting the three components again to increase the lifting height of the construction phase elevator car, the assembly platform 22 and the at least one distance member 26 are lowered by means of the lifting device 24 far enough that the upper end of the distance member is located just inside the opening 27 in the first protective platform 25. Then, the upward sliding of the at least one distance member 26 through the first protective platform 25 is prevented by means of a blocking device, for example by means of a plug-in bolt 28, so that, when the assembly platform 22 is lifted again by the self-propelled construction phase elevator car 4, the first protective platform 25 is also lifted by the intended distance to the assembly platform 22.

FIG. 2 also shows that the second protective platform 23 and the assembly platform 22 can advantageously form a unit which can be lifted by means of the self-propelled construction phase elevator car 4, by forming the second protective platform 23 shown in FIG. 1 into the assembly platform 22 shown in FIG. 2, from which assembly platform 22 at least the at least one guide rail strand 5 can be extended upward. However, such a combination of protective platform and assembly platform is not necessarily required.

Figures 3A, 3B:
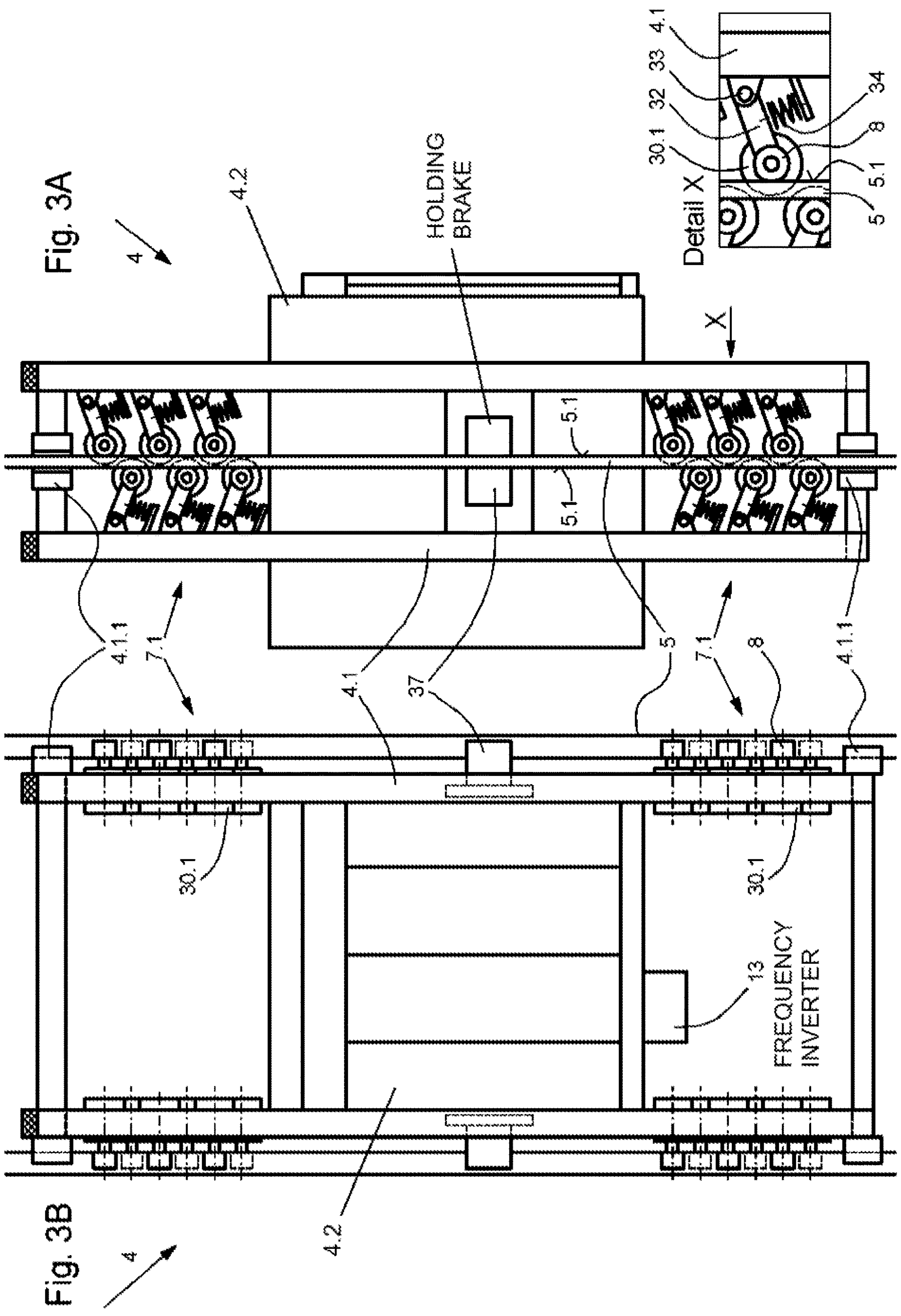
FIG. 3A is a side view of a self-propelled construction phase elevator car suitable for carrying out the method according to the invention, which car has a first embodiment of the friction wheel drive.
FIG. 3B is a front view of the construction phase elevator car according to FIG. 3A.

FIG. 3A shows a construction phase elevator car 4 suitable for use in the method according to the invention in a side view, and FIG. 3B shows this construction phase elevator car in a front view. The construction phase elevator car 4 comprises a car frame 4.1 having car guide shoes 4.1.1 and a car body 4.2 mounted in the car frame, which car body is provided for accommodating passengers and objects. The car frame 4.1 and thus also the car body 4.2 are guided on guide rail strands 5 via car guide shoes 4.1.1, which guide rail strands are preferably fastened to walls of the elevator shaft and, as explained above, form the secondary part of the drive system 7.1 of the construction phase elevator car 4 and are later used to guide the final elevator car of a final elevator installation.

The drive system 7.1 shown in FIGS. 3A and 3B comprises a plurality of driven friction wheels 8 which interact with the guide rail strands 5 in order to move the self-propelled construction phase elevator car 4 along an elevator shaft of a building in its construction phase. The friction wheels are each arranged within the car frame 4.1 of the construction phase elevator car 4 above and below the car body 4.2, at least one friction wheel acting on each of the opposing guide surfaces 5.1 of the guide rail strands 5. If sufficient room is available for the drive motors between the car body and the car frame, the friction wheels can also be attached to the side of the car body.

In the embodiment of the drive system 7.1 shown here, each of the friction wheels 8 is driven by an associated electric motor 30.1, each friction wheel and its associated electric motor preferably being arranged on the same axis (coaxially). Each of the friction wheels 8 is rotatably mounted on one end of a pivot lever 32 so as to be coaxial with the rotor of the associated electric motor 30.1. The pivot lever 32 associated with each of the friction wheels is pivotally mounted at its other end on a pivot axle 33 fixed to the car frame 4.1 of the construction phase elevator car 4, in such a way that the center of the friction wheel 8 lies below the axis line of the pivot axle 33 of the pivot lever 32 when the friction wheel 8 is pressed against its associated guide surface 5.1 of the at least one guide rail strand. The pivot lever 32 and friction wheel 8 are arranged in such a way that a straight line extending from the pivot axle 33 to the point of contact between the friction wheel 8 and guide surface 5.1 is preferably inclined at an angle of 15° to 30° relative to a normal to the guide surface 5.1. The pivot lever 32 is loaded by a pretensioned compression spring 34 in such a way that the friction wheel 8 mounted at the end of the pivot lever is pressed with a minimum pressing force against the guide surface 5.1 associated therewith. The described arrangement of the friction wheels and the pivot levers ensures that, when the construction phase elevator car 4 is being driven in an upward direction, pressing forces are automatically generated between the friction wheels 8 and the associated guide surfaces 5.1 of the guide rail strand, which pressing forces are approximately proportional to the driving force transmitted from the guide surface to the friction wheel. This ensures that the friction wheels do not have to be continuously pressed as hard as would be necessary to lift the elevator car 4 loaded with maximum load and the other components discussed above. This considerably reduces the risk of the periphery of the plastics-coated friction wheels being flattened as a result of prolonged pressing at the maximum necessary pressing force.

An additional measure for preventing the plastics friction linings of the friction wheels 8 from being flattened consists in the fact that, during each standstill of the construction phase elevator car 4, the load on the friction wheels 8 is relieved by activating a holding brake 37 that acts between the construction phase elevator car and the elevator shaft, preferably between the construction phase elevator car and the at least one guide rail strand 5, and the torque transmitted by the drive motors 30.1 to the friction wheels is at least reduced. A brake which is only used for this purpose or a controllable safety brake can be used as the holding brake.

In order to control the travel speed, the electric motors 30.1 are fed via a frequency converter 13 that is controlled by an elevator controller (not shown).

As can be seen from FIGS. 3A, 3B and the detail X shown, the diameters of the electric motors 30.1 are substantially larger than the diameters of the friction wheels 8 driven by the electric motors. This is necessary so that the electric motors can generate sufficiently high torques for driving the friction wheels. In order to provide sufficient installation space for the electric motors 30.1 arranged on both sides of the guide rail strand 5, relatively large vertical spaces between the individual friction wheel arrangements are required. As a result, the installation spaces for the drive system 7.1 and thus the entire car frame 4.1 become correspondingly high.

FIGS. 4A and 4B show a self-propelled construction phase elevator car 4 which is very similar in function and appearance to the construction phase elevator car shown in FIGS. 3A and 3B. A drive system 7.2 having driven friction wheels 8 is shown, which system allows the use of electric motors, the diameters of which correspond, for example, to three to four times the friction wheel diameter without their vertical spacing from one another having to be greater than the motor diameters. The height of the installation spaces for the drive system 7.2 can thus be minimized. This is achieved by the electric motors 30.2 of the friction wheels 8 that act on one guide surface 5.1 of a guide rail strand 5 being arranged so as to be offset by approximately one motor length in the axial direction of the electric motors relative to the electric motors of the friction wheels acting on the other guide surface 5.1. Although the spacing between two electric motors of this kind is smaller than their diameter, this measure prevents the installation spaces of these electric motors from overlapping. This is particularly clear from FIG. 4B, which also shows that the electric motors 30.2 are preferably relatively short in design and have relatively large diameters. With large motor diameters, the necessary drive torques for the friction wheels 8 are easier to generate.

Figures 5A, 5B:
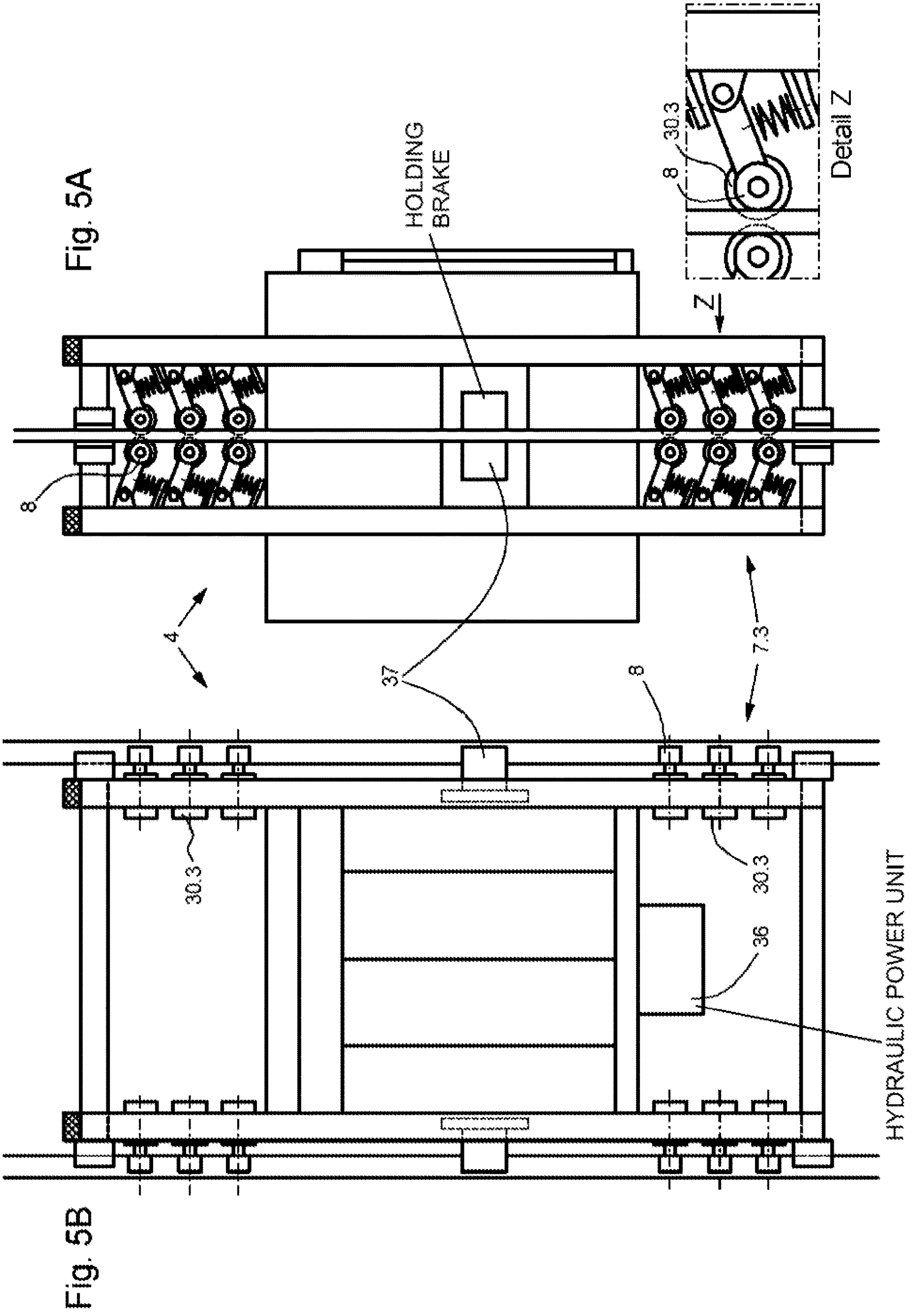
FIG. 5A is a side view of a self-propelled construction phase elevator car suitable for carrying out the method according to the invention, which car has a third embodiment of the friction wheel drive.
FIG. 5B is a front view of the construction phase elevator car according to FIG. 5A.

FIGS. 5A and 5B show a self-propelled construction phase elevator car 4 which is very similar in function and appearance to the construction phase elevator cars shown in FIGS. 3A, 3B and 4A, 4B. The height of the installation spaces for the drive system 7.3 and thus the overall height of the construction phase elevator car is, however, reduced in this embodiment by using smaller drive motors for the friction wheels 8. The vertical distances between the individual friction wheel arrangements are in this case no longer determined by the installation spaces for the drive motors. This is achieved by the use of hydraulic motors 30.3 instead of electric motors for driving the friction wheels 8. In relation to the total motor volume, hydraulic motors are capable of generating significantly higher torques than electric motors. Hydraulic motors can therefore also be used to drive friction wheels having larger diameters, which allow a higher pressing force to be applied and can therefore transmit a higher traction force.

Hydraulic drives require at least one hydraulic power unit 36, which preferably comprises an electrically driven hydraulic pump. In order to feed the hydraulic motors 30.3 that drive the friction wheels 8 at variable speeds, it is possible to use, for example, a hydraulic pump that has an electrohydraulically controllable delivery volume and is driven by an electric motor at a constant speed or a hydraulic pump that has a constant delivery volume and is driven by an electric motor, the speed of which is controlled by a frequency converter. The hydraulic motors are preferably operated in a hydraulic parallel circuit. However, series circuitry is also possible. Power is preferably supplied to the hydraulic power unit 36 via a conductor line, as explained for feeding the electric motors in the context of FIGS. 1 and 2.

During a standstill, the construction phase elevator car 4 according to FIGS. 5A and 5B is also locked in the elevator shaft by holding brakes 37, the driving torques exerted by the hydraulic motors 30.3 on the friction wheels 8 being at least reduced.

FIG. 6 shows a part of a drive system 7.4 of a self-propelled construction phase elevator car arranged below the car body 4.2 of this construction phase elevator car. An arrangement of a group of a plurality of friction wheels 8.1-8.6 that are rotatably mounted on pivot levers 32.1-32.6 and pressed against a guide rail strand 5 by means of compression springs 34.1-34.6 is shown, which arrangement has already been explained above in the context of the description in relation to FIGS. 3A and 3B. However, in contrast to the drive systems shown in FIGS. 3A, 3B, 4A, 4B and 5A, 5B, in this case not all of the friction wheels 8.1-8.6 are individually driven by a drive motor assigned to the particular friction wheel, but instead the friction wheels 8.1-8.6 are driven by a common drive motor 30.4 associated with the group of friction wheels, via a toothed gear 38 having two drive chain wheels 38.1, 38.2 rotating in opposite directions and via a mechanical gear in the form of a chain gear arrangement 40. For example, a variable-speed electric motor or a variable-speed hydraulic motor can be used as the common drive motor. Instead of the chain gear arrangement 40, other gear types can also be used, such as a belt gear, preferably a toothed belt gear, toothed gear, bevel shaft gears or combinations of gears of this kind. The part of the chain gear arrangement 40 shown on the left-hand side of the drive system 7.4 comprises a first chain strand 40.1 which transmits the rotational movement from the drive chain wheel 38.1 of the toothed gear 38 to a triple chain wheel 40.7 mounted on the stationary pivot axle of the uppermost pivot lever 32.1. From this triple chain wheel 40.7, the rotational movement is transmitted via a second chain strand 40.2 to a chain wheel fixed on the rotary shaft of the friction wheel 8.1 and thus to the friction wheel 8.1. Moreover, the rotational movement is transmitted from the triple chain wheel 40.7 via a third chain strand 40.3 to a triple chain wheel 40.8 arranged therebelow and mounted on the fixed pivot axle of the central pivot lever 32.2. From this triple chain wheel 40.8, the rotational movement is transmitted via a fourth chain strand 40.4 to a chain wheel fixed on the rotary shaft of the friction wheel 8.2 and thus to the friction wheel 8.2. Moreover, the rotational movement is transmitted from the triple chain wheel 40.8 via a fifth chain strand 40.5 to a triple chain wheel 40.9 arranged therebelow and mounted on the fixed pivot axle of the central pivot lever 32.3. From this triple chain wheel 40.9, the rotational movement is transmitted via a sixth chain strand 40.6 to a chain wheel fixed on the rotary shaft of the friction wheel 8.2 and thus to the friction wheel 8.2. The part of the chain gear arrangement 40 shown on the right-hand side of the drive system 7.4 is arranged substantially symmetrically to the part of the chain gear 40 described above that is shown on the left-hand side of the drive system 7.4, and has the same functions and effects.

Figure 7:
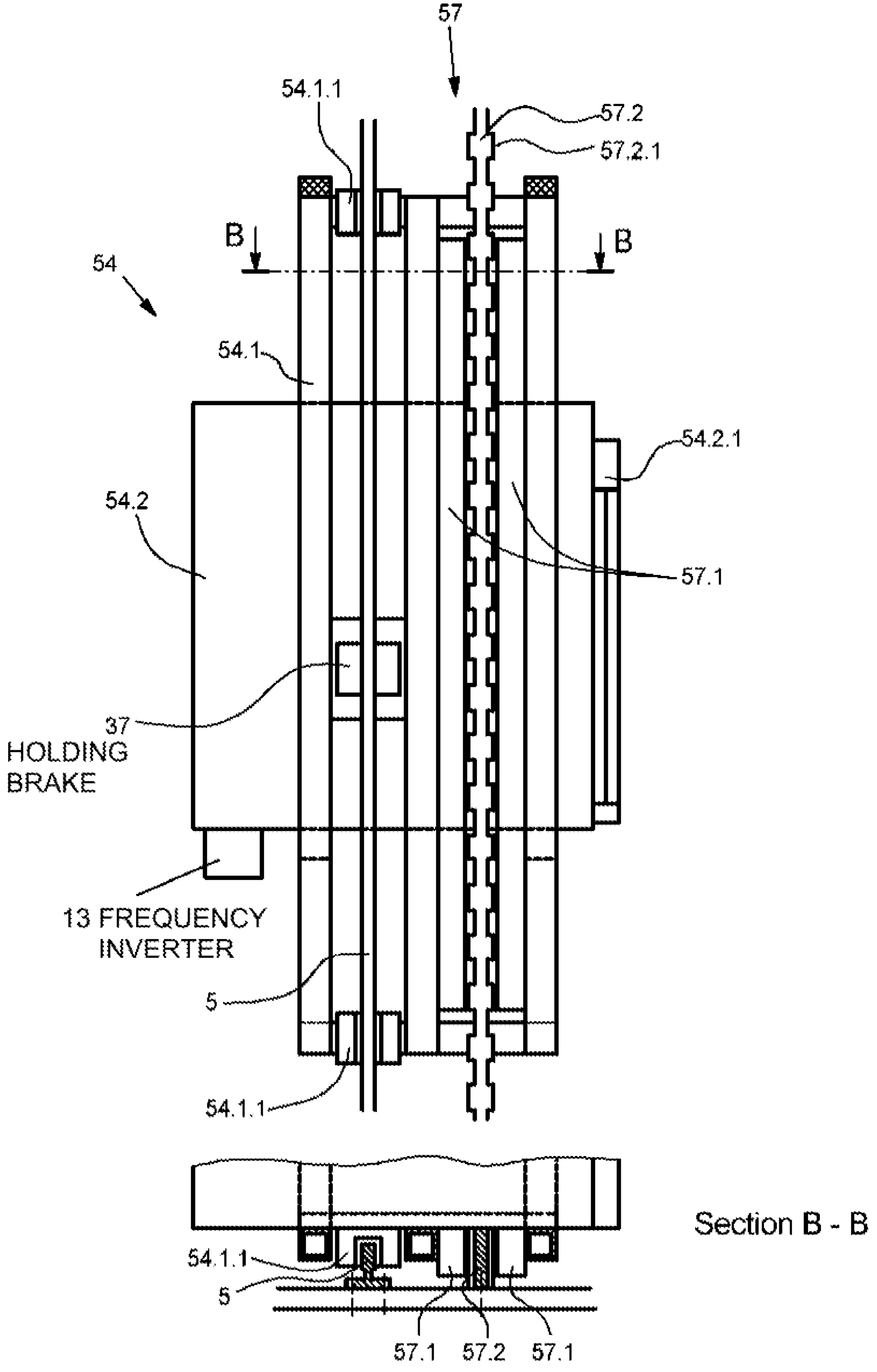
FIG. 7 is a side view of a self-propelled construction phase elevator car suitable for carrying out the method according to the invention, which car has a further embodiment of its drive system, together with a cross section through the region of the drive system.

FIG. 7 shows another possible embodiment of a self-propelled construction phase elevator car suitable for use in the method according to the invention. This construction phase elevator car 54 comprises a car frame 54.1 and a car body 54.2 which is mounted in the car frame and has a car door system 54.2.1. The car frame 54.1 and thus also the car body 54.2 are guided via car guide shoes 54.1.1 on guide rail strands 5, which guide rail strands are preferably fastened to walls of an elevator shaft. At least one electric linear motor, preferably a reluctance linear motor, is used as a drive system 57 for the construction phase elevator car 54, which linear motor comprises at least one primary part 57.1 fastened to the car frame 54.1 and at least one secondary part 57.2 that extends along the travel path of the construction phase elevator car 54 and is fixed to the elevator shaft. In the embodiment shown in FIG. 7, the construction phase elevator car 54 is equipped with a drive system 57 which comprises a reluctance linear motor on each of two sides of the construction phase elevator car 54, each reluctance linear motor having a primary part 57.1 and a secondary part 57.2. Each primary part 57.1 contains rows of electrically actuatable electromagnets arranged on two sides of the associated secondary part, which electromagnets are not shown here. In the reluctance linear motor, the secondary part 57.2 is a rail made of a soft-magnetic material, which rail has protruding regions 57.2.1 at regular spacings on the two sides facing the electromagnets of the primary part 57.1. When the electromagnets are electrically actuated in a suitable and generally known manner, maximum magnetic fluxes result between each two adjacent electromagnets having opposite polarity when the present magnetic resistance is at its lowest, i.e. when the protruding regions 57.2.1 of the secondary part are located approximately in the center of the magnetic flux between each two electromagnets. The magnetic fluxes generate forces that attempt to minimize the magnetic resistance (reluctance) for the magnetic fluxes, with the result that the protruding regions 57.2.1 of the secondary part 57.2, which protruding regions act as poles, are drawn towards the center between two adjacent electromagnets that are currently maximally energized. In this way, a plurality of electromagnetic pairs, the maximum energization or magnetic flux of which occurs in a temporally offset manner, produce a driving force necessary for driving the self-propelled construction phase elevator car 54.

In principle, all known linear motor principles can be used as a drive system for a self-propelled construction phase elevator car, for example also linear motors which have a plurality of permanent magnets arranged along the secondary part as counter poles to electromagnets actuated with an alternating current strength in the primary part. For self-propelled construction phase elevator cars with a large usable lifting height, however, reluctance linear motors can be realized at the lowest cost.

In order to actuate electric linear motors of this kind, it is advantageous to use frequency converters, the mode of operation of which is generally known. In FIG. 7, a frequency converter 13 of this kind is attached to the car frame 54.1 below the car body 54.2. In this embodiment, a holding brake 37 acting between the construction phase elevator car 54 and the guide rail strand 5 also locks the construction phase elevator car 54 during its standstill, such that the linear motor of the drive system 57 does not have to be permanently activated and does not heat up excessively.

Figure 8:
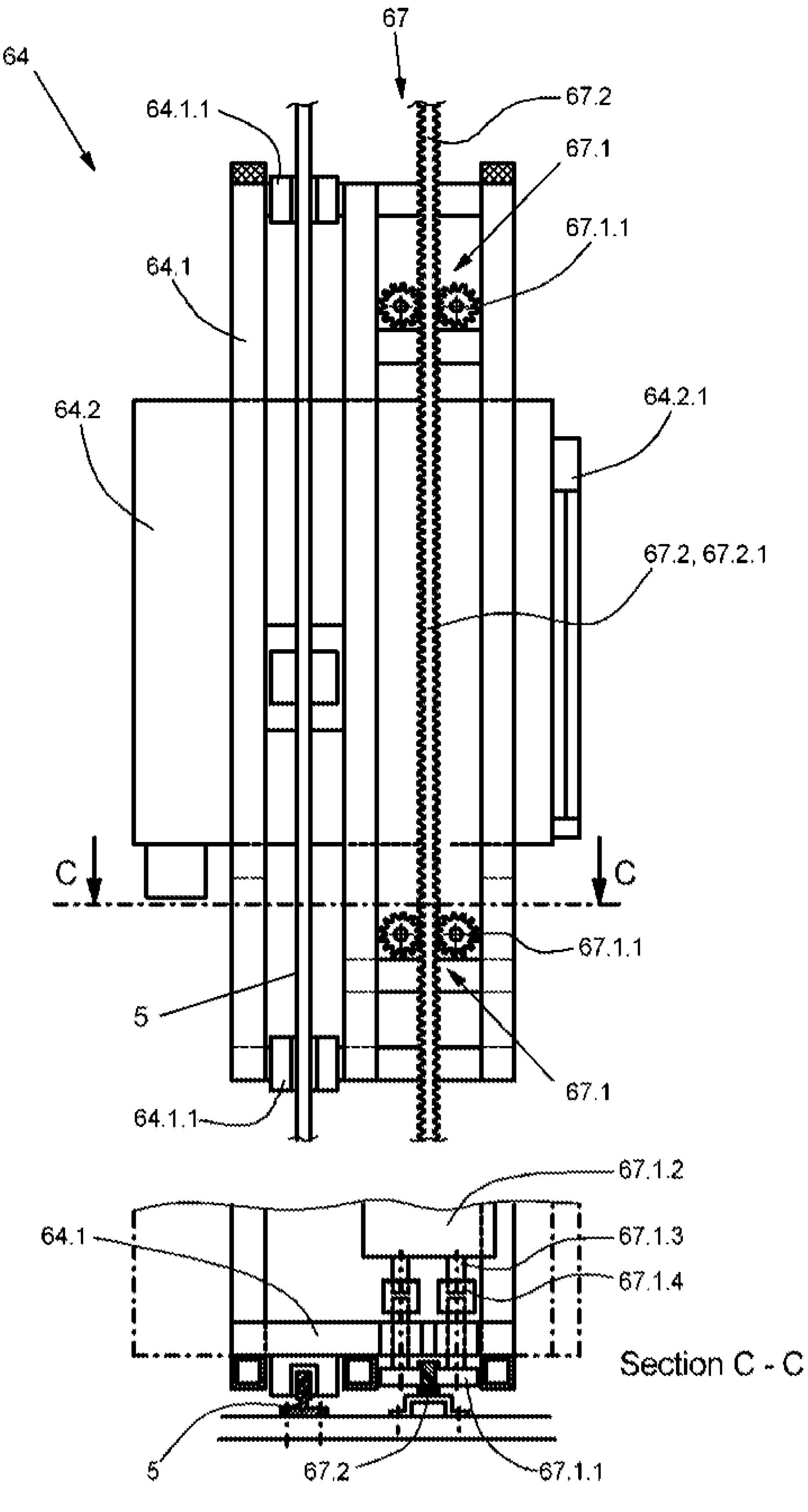
FIG. 8 is a side view of a self-propelled construction phase elevator car suitable for carrying out the method according to the invention, which car has a further embodiment of its drive system, together with a cross section through the region of the drive system.

FIG. 8 shows another possible embodiment of a self-propelled construction phase elevator car suitable for use in the method according to the invention. This construction phase elevator car 64 comprises a car frame 64.1 and a car body 64.2 mounted in the car frame. This car body is also provided with a car door system 64.2.1 which interacts with shaft doors on the floors of the building in its construction phase. The car frame 64.1 and thus also the car body 64.2 are guided via car guide shoes 64.1.1 on guide rail strands 5, which guide rail strands are preferably fastened to walls of an elevator shaft. A rack-and-pinion system is used as a drive system 67 for the construction phase elevator car 64, which rack-and-pinion system comprises at least one pinion 67.1.1 driven by an electric motor or electric gear motor 67.1.2 as a primary part 67.1 and at least one rack 67.2.1 that extends along the travel path of the construction phase elevator car 64 and is temporarily fixed in the elevator shaft during the construction phase of the building as a secondary part 67.2. In the embodiment shown in FIG. 8, the construction phase elevator car 64 is equipped with a drive system 67 which comprises a rack 67.2.1 fixed in the elevator shaft on each of two sides of the construction phase elevator car 64, each of the racks having teeth on two opposing sides. A total of four pairs of driven pinions 67.1.1 interact with the two racks 67.2.1 in order to move the self-propelled construction phase elevator car 64 up and down in the elevator shaft. Preferably, each of the four pairs of pinions 67.1.1 is driven by an electric gear motor 67.1.2 installed in the car frame 64.1, which electric gear motor preferably has two output shafts 67.1.3 arranged side by side and driven by a transfer gear. Each of the two output shafts is connected via a torsionally elastic coupling 67.1.4 to a shaft of the associated pinion 67.1.1 which is mounted in the car frame 64.1. This embodiment allows the use of standard motors having sufficient power, even when shafts of a pair of pinions lie close together. In an alternative embodiment of the rack-and-pinion system, all of the pinions 67.1.1 can be driven by an electric motor or electric gear motor associated with one of the pinions in each case. In both embodiments mentioned, using asynchronous motors ensures that all pinions are driven at the same high torque at all times. It is also understood that a construction phase elevator car 64 of this kind can also be equipped with more than four pairs of pinions and related drive devices. This may be necessary in particular if the construction phase elevator car has to lift assembly aid devices in addition to its own weight, as described above in the description in relation to FIGS. 1 and 2.

Figure 9:
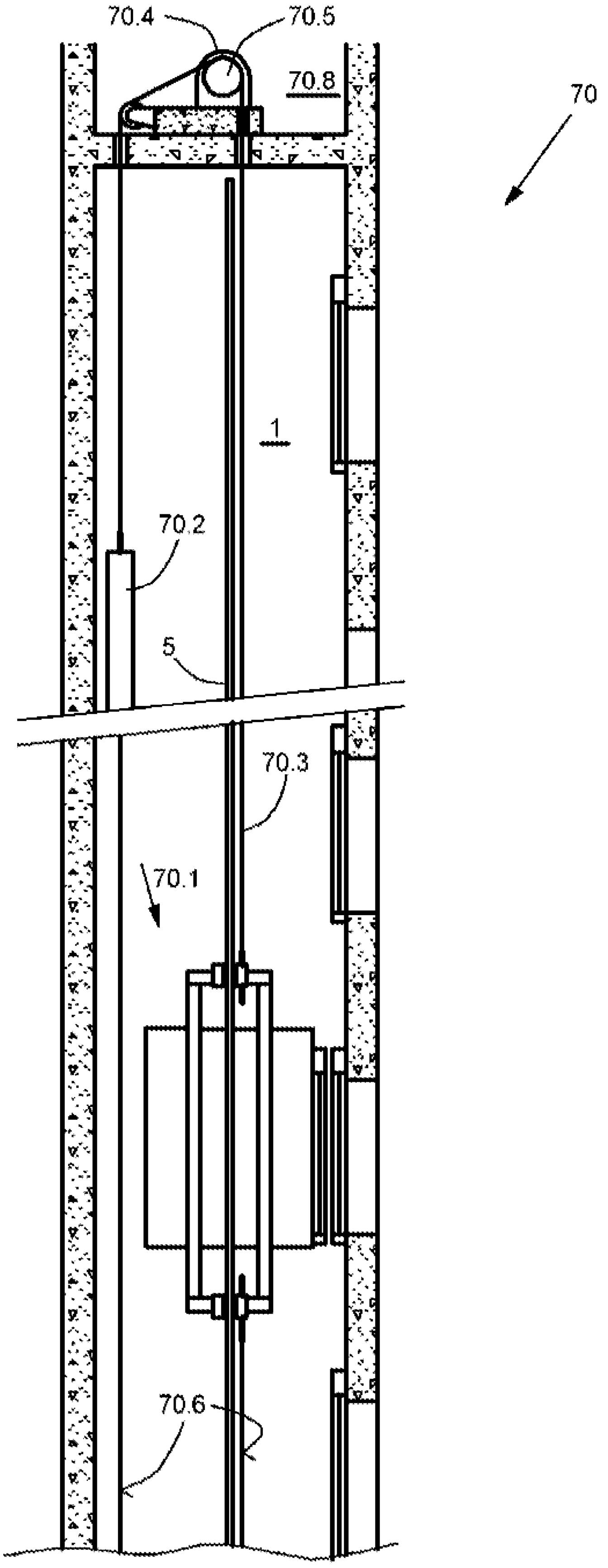
FIG. 9 is a vertical cross section through a final elevator installation constructed in accordance with the method according to the invention and having an elevator car and a counterweight, with the elevator car and the counterweight being suspended on flexible suspension means and being driven via these suspension means by a drive machine.

FIG. 9 shows a vertical cross section through a final elevator installation 70 created in the elevator shaft 1 in accordance with the method according to the invention. This comprises an elevator car 70.1 and a counterweight 70.2 which are suspended on flexible suspension means 70.3 and are driven via these suspension means by a stationary drive machine 70.4 comprising a traction sheave 70.5. The drive machine 70.4 is preferably installed in a machine room 70.8 arranged above the elevator shaft 1. After elevator shaft 1 has reached its final height, the self-propelled construction phase elevator car (4; 54; 64, FIGS. 1-7) used during the construction phase is dismantled. The elevator car 70.1, the counterweight 70.2, the drive machine 70.4 and the suspension means 70.3 of the final elevator installation 70 are subsequently assembled, the elevator car 70.1 being guided on the same guide rails 5 on which the construction phase elevator car was also guided. The reference sign 70.6 designates compensation traction means, for example compensation cables or compensation chains, that are preferably provided in a final elevator installation 70. Such compensation traction means 70.6 are preferably guided around a tension pulley arranged in the foot of the elevator shaft, which is not visible here. However, they can also be suspended freely in elevator shaft 1 between the elevator car 70.1 and the counterweight 70.2.

Figure 10:
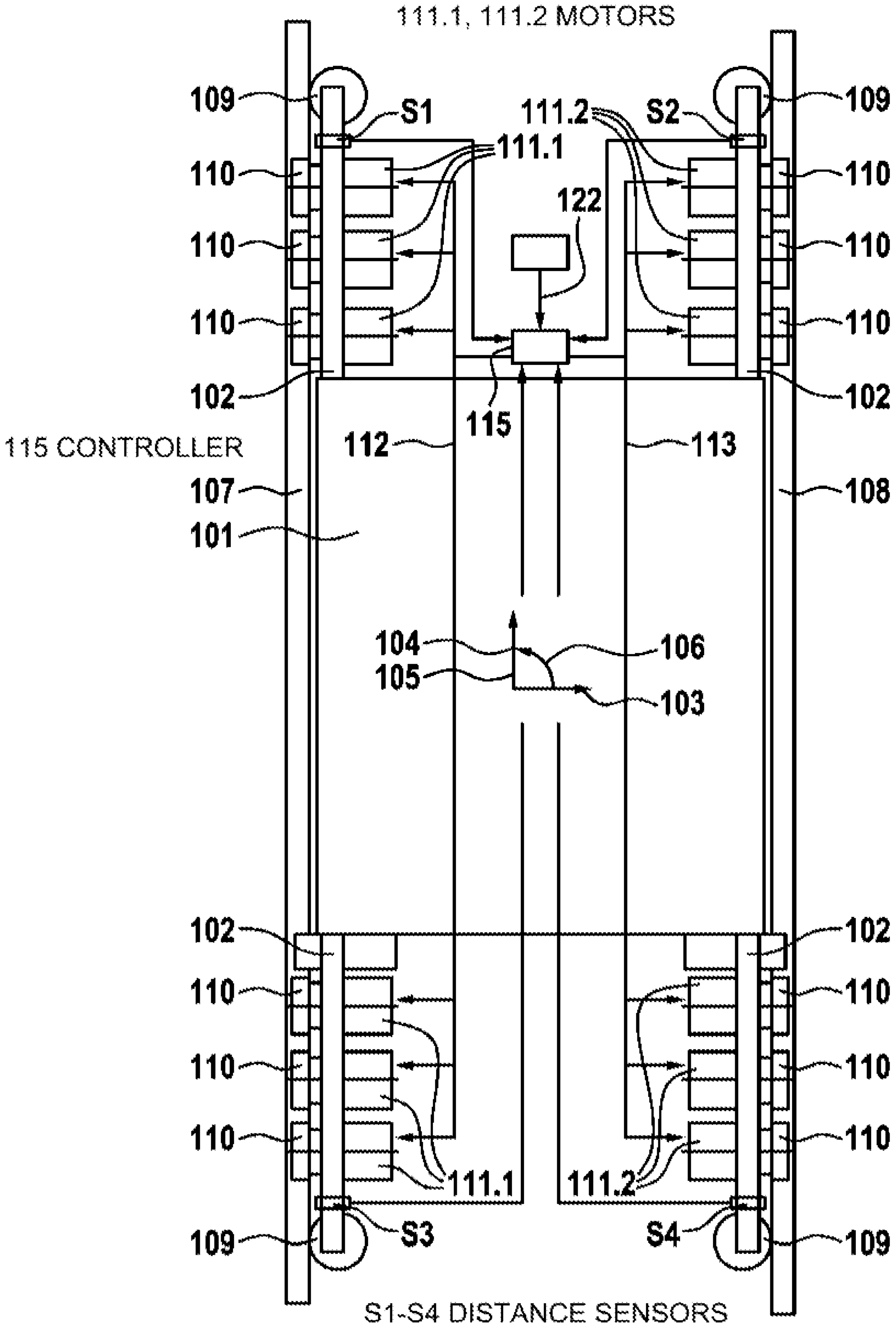
FIG. 10 is a schematic front view of an elevator car according to the invention, which car is equipped to be centered using a method according to the second aspect of the invention.

FIG. 10 shows an elevator car 101 which is fastened to a frame 102. In the embodiment shown, the elevator car 101 is a construction phase elevator car as described above and below. A horizontal Y-direction 103 and a vertical Z-direction 104 are defined in FIG. 10. The center plane 105 of the elevator car is also shown in the Z-direction, which center plane falls on the Z-axis 104 in the centered state shown. A φ slip angle 106 spans between the Y-direction 103 and the center plane 105 of the elevator car 101, which angle is 90° in the shown centered state of the car. A first guide rail strand 107 is shown which is located on the left in the figure, and a second guide rail strand 108 is shown which is located on the right in the figure. The car is guided in the Y-direction 103 on the two guide rail strands 107, 108 by four passive guide rollers 109 which are fastened to the end of the frame 102. The further away the guide rollers 109 are from the center of the car (not shown), the better their guiding effect. The elevator car is driven by friction wheels 110. In the embodiment, a total twelve friction wheels 110 are shown, each together with an electric motor 111.1, 111.2. If the friction wheels 110 are inaccurately aligned or if the driving force on the two guide rail strands 107, 108 is unequal, the elevator car 101 may be skewed despite the guide rollers 109, i.e. the elevator car may experience a transverse displacement. In a case of this kind, the φ angle 106 deviates from the 90° shown in the figure. Depending on the type of misalignment, the φ angle is either larger or smaller than 90°. A misalignment of this kind can lead to large forces on the guide rollers 109.

In order to prevent this, four distance sensors S1, S2, S3, S4 are fastened to the elevator car 101 in this embodiment. The four distance sensors S1, S2, S3, S4 measure the distance between the car frame 102 and the guide rail strands 107, 108 in the Y-direction 103. They are attached near the guide rollers 109. The distance sensors S1, S2, S3, S4 are designed as eddy current sensors. The signal from the distance sensors S1, S2, S3, S4 is directed to a controller 115 which, on the basis of the measured values, actuates the motors 111.1, 111.2 so as to compensate for the transverse displacement and the misalignment of the elevator car 101. For this purpose, all of the motors 111.1 that act on the first guide rail strand (left) are actuated at a first rotational speed 112, and all of the motors 111.2 that act on the second guide rail strand (right) are actuated at a second rotational speed 113. The ΔV speed difference thus corrects the misalignment during the movement of the elevator car 101 in the Z-direction 104.

Figure 11:
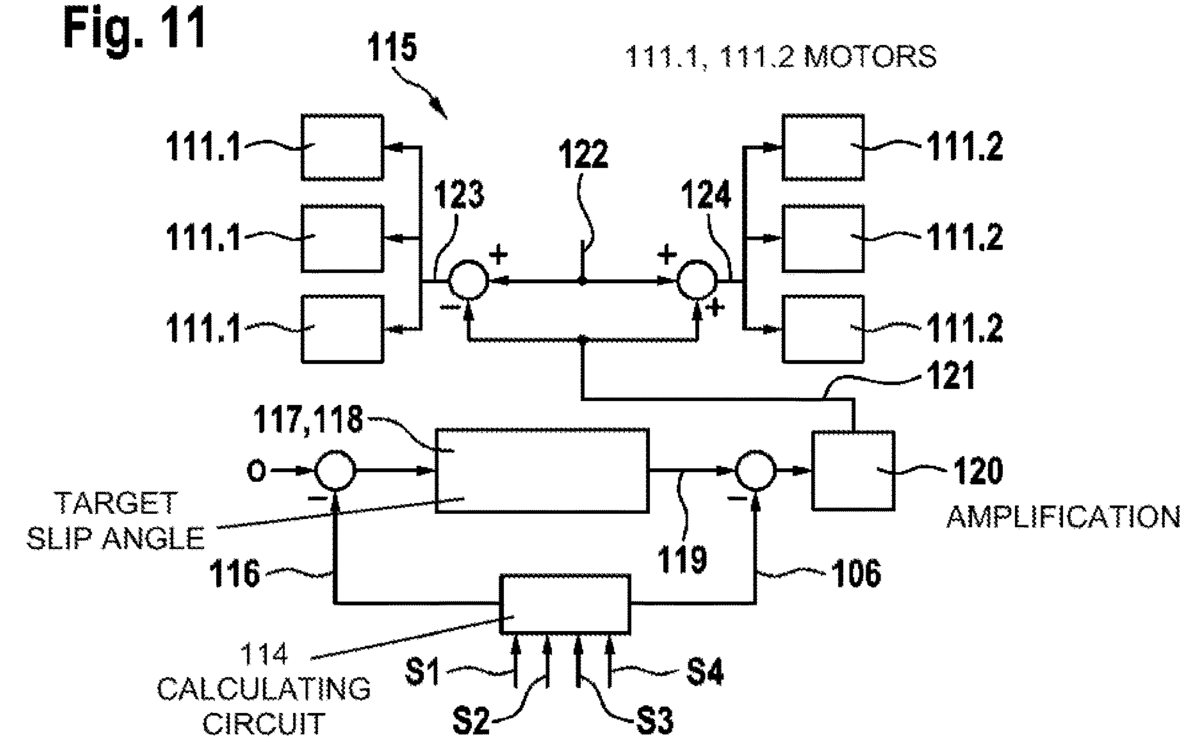
FIG. 11 is a schematic view of an implementation of a control system for carrying out the method according to the invention according to the second aspect of the invention.

FIG. 11 shows a schematic description of a system according to the invention for controlling the lateral position as implemented in an embodiment of the controller 115 (see FIG. 10). From the sensor signals, a circuit 114 calculates the position deviation 116 of the center of the car in the Y-direction from the center plane between the guide rails, and from this calculates the φ slip angle 106.

$$Y=\tfrac{1}{4}(S1-S2+S3-S4)$$

$$\varphi=\frac{S2-S1+S3-S4}{2*H}$$

The measured variables Y and φ are always related to the guide rails, i.e. the elevator is repositioned with respect to the guide rail strands.

In an alternative embodiment (not shown), the φ slip angle 106 is measured directly as an absolute variable by means of an inclination sensor.

The elevator car position is kept in the middle between the rails as a result of the control. If it is off-center, i.e. if the Z-axis is not in the center plane 105 of the elevator car 101, the elevator car 101 is skewed, and therefore moves back according to the direction of travel. The φ slip angle 106 is a secondary controlled variable and the target value is 90° when Y=0. The output of the controller is the speed or rotational frequency deviations ΔV of the left-hand motors 111.1 and the right-hand motors 111.2 from the V target speed 122 in the vertical direction Z. This results in a first V1 target speed 123 for the left-hand motors and a V2 target speed 124 for the right-hand motors.

A deviation from the zero position is amplified by a proportional k1 factor multiplier 117 and the prefix is selected depending on the direction of travel 118. The result is a desired φ target slip angle 119. The deviation from φ target is multiplied by a k2 amplification factor multiplier 120 and produces a speed deviation 121 between the left-hand motors 111.1 and the right-hand motors 111.2. This sets the slip angle to the desired value.

The controller can be refined and expanded as required. For example, at speed 0, a smooth transition can be selected instead of the abrupt change. Moreover, at higher speeds, the amplification can be reduced in order to avoid noticeable vibrations. The simple proportional controller can be supplemented with integral and derivative amplification.

Figure 12:
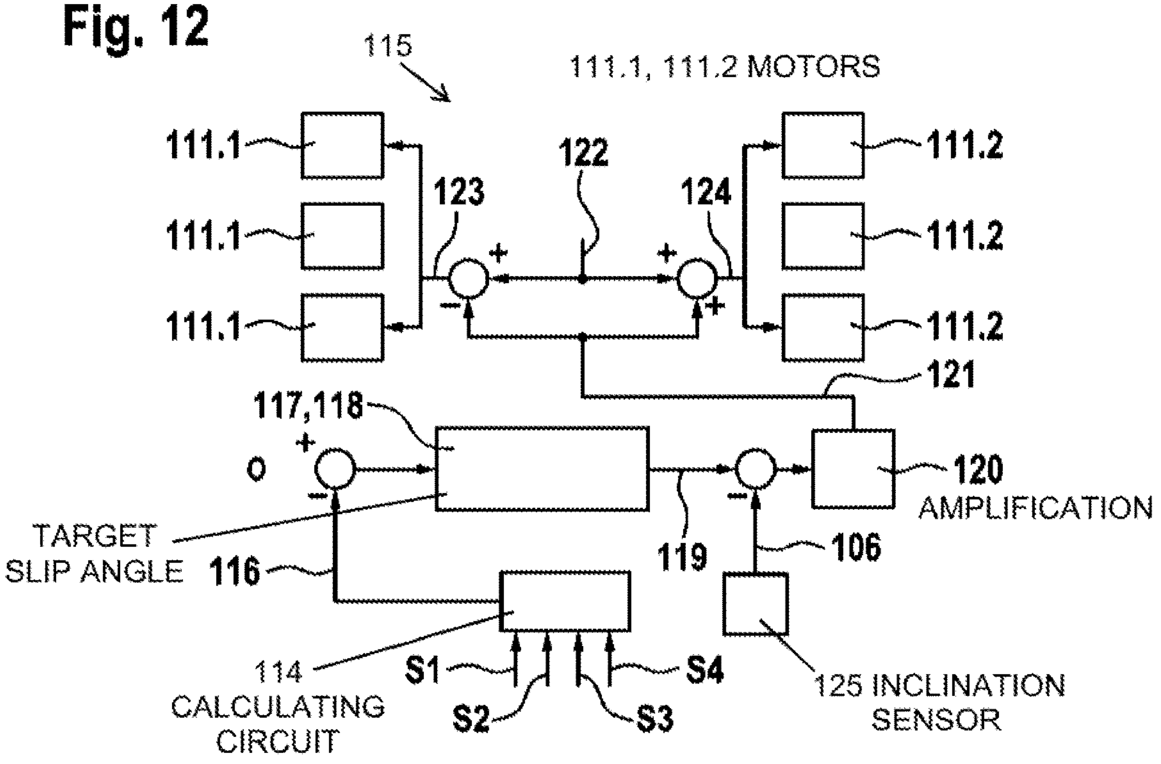
FIG. 12 is a schematic view of an alternative embodiment of an implementation for carrying out the method according to the invention according to the second aspect of the invention.

FIG. 12 shows a further implementation of a controller for carrying out a method according to the invention according to the second aspect of the invention. The φ slip angle 106 is measured directly as an absolute variable by means of an inclination sensor 125 and is sent to the controller 115 (See FIG. 11) as an input variable.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for erecting an elevator installation, wherein the elevator installation includes a self-propelled elevator car, a first guide rail strand and a second guide rail strand for guiding the elevator car along a travel path in an elevator shaft, and a drive system having a primary part attached to the elevator car and a secondary part attached along the travel path, wherein the primary part of the drive system has a plurality of driven friction wheels that interact with the secondary part of the drive system, wherein the first and second guide rail strands are used as the secondary part of the drive system, wherein at least two of the driven friction wheels are pressed against each of two opposing guide surfaces of the first and second guide rail strands to drive the elevator car, the method comprising the steps of:

controlling a first rotational speed of the driven friction wheels pressing on guide surface of the first guide rail strand and controlling a second rotational speed of the driven friction wheels pressing on the guide surface of the second guide rail strand;

adjusting the first rotational speed and the second rotational speed independently of one another;

wherein the first guide rail strand lies in a first plane and the second guide rail strand lies in a second plane extending parallel with the first plane, and, in a centered state of the elevator car, a center of the elevator car is located on a center plane extending in parallel with the first and second planes; and when a deviation of the elevator car center from the center plane is detected, changing at least one of the first rotational speed and the second rotational speed such that as the elevator car moves along the travel path, the elevator car center moves toward the center plane.

2. The method according to claim 1 including a first distance sensor measuring a first distance between the elevator car and the first guide rail strand and a second distance sensor measuring a second distance between the elevator car and the second guide rail strand, and controlling the first and second rotational speeds based on the measured first and second distances.

3. The method according to claim 2 wherein the first and second distance sensors are eddy current sensors or optical triangulation sensors.

4. The method according to claim 1 including an inclination sensor attached to the elevator car and measuring an angle of inclination of the elevator car with respect to the center plane, and controlling the first and second rotational speeds based on the measured inclination angle to change the angle of inclination toward zero.

5. The method according to claim 1 including gradually increasing or decreasing a difference between the first rotational speed and the second rotational speed.

6. The method according to claim 1 including increasing or decreasing a difference between the first rotational speed and the second rotational speed depending on a predetermined horizontal target speed for the elevator car in a direction of the travel path.

7. The method according to claim 1 wherein a centering of the elevator car toward the center plane is supported by at least two passive guide rollers attached to the elevator car and each of the guide rollers acting on one of the first and second guide rail strands.

8. A method for erecting an elevator installation, wherein the elevator installation includes a first guide rail strand and a second guide rail strand for guiding an elevator car along a travel path in an elevator shaft, the method comprising the steps of:

providing a self-propelled elevator car and a drive system in the elevator shaft, the drive system having a primary part attached to the elevator car and a secondary part including the first and second guide rail strands attached along the travel path, wherein the primary part of the drive system has a plurality of driven friction wheels with at least two of the driven friction wheels pressed against each of two opposing guide surfaces of the first and second guide rail strands to drive the elevator car;

controlling a first rotational speed of the driven friction wheels pressing on guide surface of the first guide rail strand and controlling a second rotational speed of the driven friction wheels pressing on the guide surface of the second guide rail strand to move the elevator car along the travel path;

adjusting the first rotational speed and the second rotational speed independently of one another;

wherein the first guide rail strand lies in a first plane and the second guide rail strand lies in a second plane extending parallel with the first plane, and, in a centered state of the elevator car, a center of the elevator car is located on a center plane extending in parallel with the first and second planes; and when a deviation of the elevator car center from the center plane is detected, changing at least one of the first rotational speed and the second rotational speed such that as the elevator car moves along the travel path, the elevator car center moves toward the center plane.

9. The method according to claim 8 including a first distance sensor measuring a first distance between the elevator car and the first guide rail strand and a second distance sensor measuring a second distance between the elevator car and the second guide rail strand, and controlling the first and second rotational speeds based on the measured first and second distances.

10. The method according to claim 9 wherein the first and second distance sensors are eddy current sensors or optical triangulation sensors.

11. The method according to claim 8 including an inclination sensor attached to the elevator car and measuring an angle of inclination of the elevator car with respect to the center plane, and controlling the first and second rotational speeds based on the measured inclination angle to change the angle of inclination toward zero.

12. The method according to claim 8 including gradually increasing or decreasing a difference between the first rotational speed and the second rotational speed.

13. The method according to claim 8 including increasing or decreasing a difference between the first rotational speed and the second rotational speed depending on a predetermined horizontal target speed for the elevator car in a direction of the travel path.

14. The method according to claim 8 wherein a centering of the elevator car toward the center plane is supported by at least two passive guide rollers attached to the elevator car and each of the guide rollers acting on one of the first and second guide rail strands.

* * * * *